United States Patent [19]

Kishi

[11] 4,041,537
[45] Aug. 9, 1977

[54] TAPE CASSETTE WITH LOCKING SENSOR SLIDE

[75] Inventor: Yoshio Kishi, Tokyo, Japan

[73] Assignee: Sony Corporation, Tokyo, Japan

[21] Appl. No.: 675,461

[22] Filed: Apr. 9, 1976

[30] Foreign Application Priority Data

Apr. 17, 1975  Japan ............................ 50-52352[U]

[51] Int. Cl.² .................... G11B 23/08; G11B 23/00
[52] U.S. Cl. ................................. 360/60; 242/200; 360/132
[58] Field of Search .................. 360/60, 132, 137; 242/199, 200

[56] References Cited

U.S. PATENT DOCUMENTS

| 3,828,363 | 8/1974 | Somer | 360/60 |
|---|---|---|---|
| 3,848,265 | 11/1974 | Biery et al. | 360/60 |
| 3,932,892 | 1/1976 | Saito | 360/60 |
| 3,940,799 | 2/1976 | Matsumoto | 360/60 |
| 3,950,786 | 4/1976 | Shapley | 360/60 |

*Primary Examiner*—Jay P. Lucas
*Attorney, Agent, or Firm*—Lewis H. Eslinger; Alvin Sinderbrand

[57] ABSTRACT

In a tape cassette for use in a tape recording and reproducing apparatus having an actuating element which is engageable by the cassette, when the latter is operatively positioned in the apparatus, for selectively placing the recording circuit of the apparatus in its operative and inoperative modes; the cassette housing is formed with a recess having an opening at a wall portion which is adjacent the actuating element when the cassette is operatively positioned; and a control element is provided with a body portion slidably movable in the recess between positions in which it respectively blocks and unblocks the opening to the recess for controlling the actuating element, and a resilient arm extending from the body portion and terminating in a projection which is selectively engageable in holes formed in the wall portion adjacent the opening to the recess for releasably locking the body portion in either one of its aforementioned positions.

11 Claims, 9 Drawing Figures

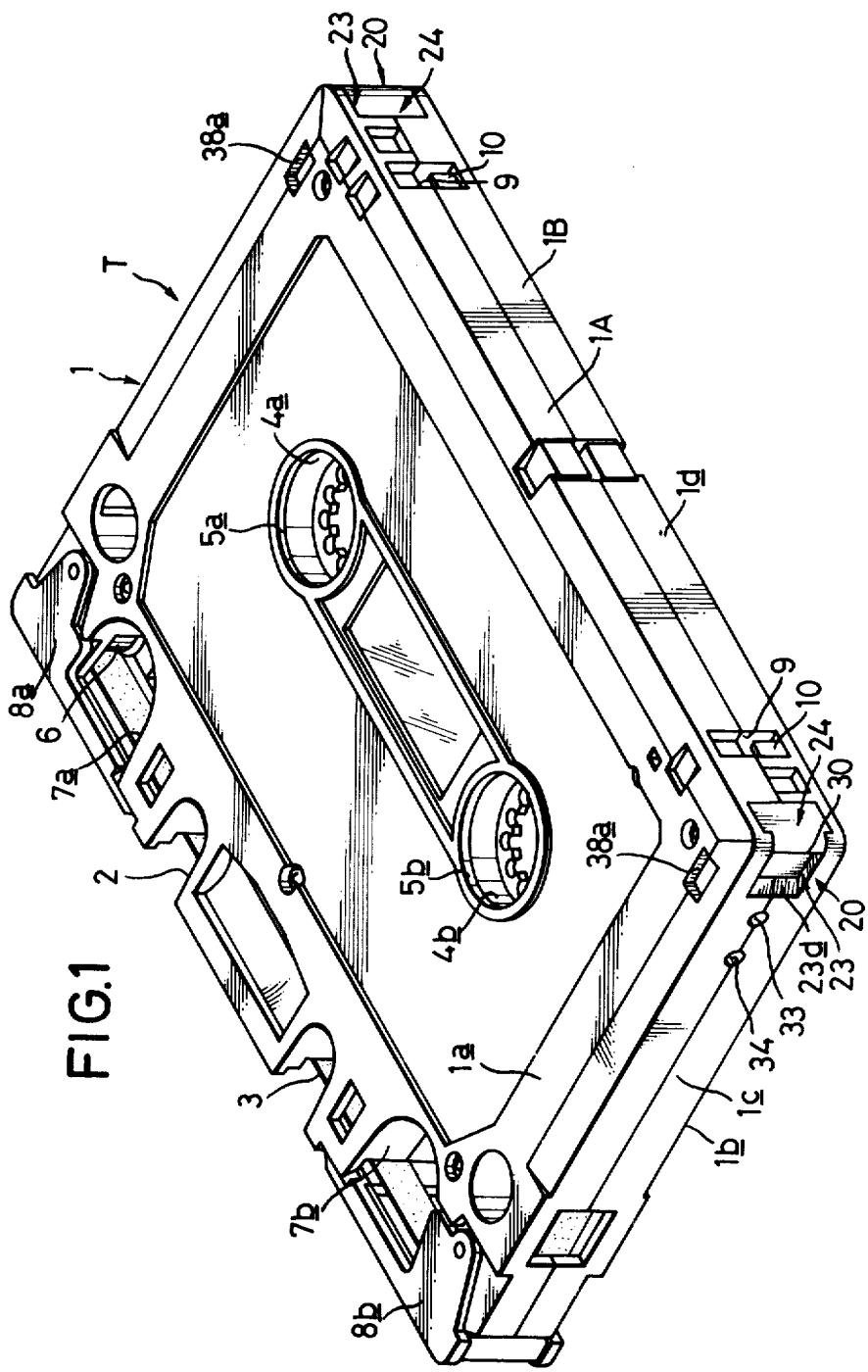

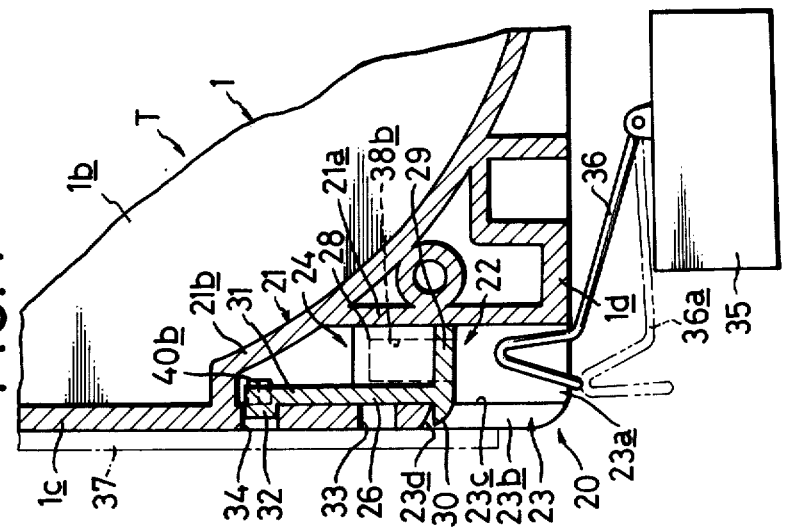
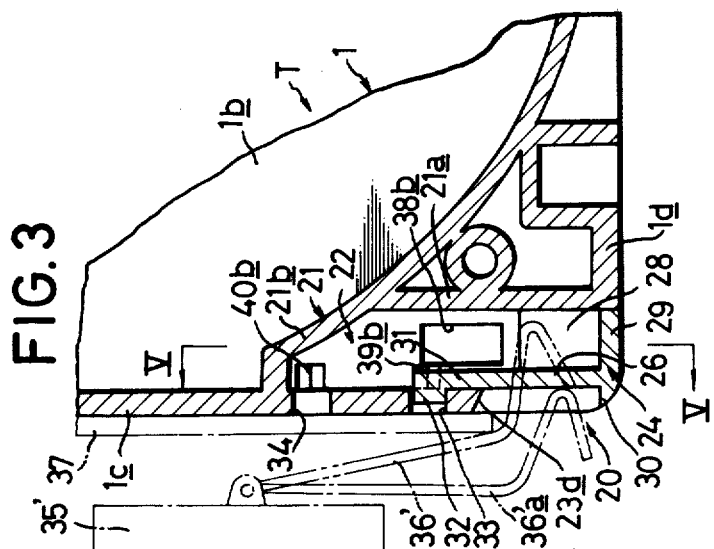
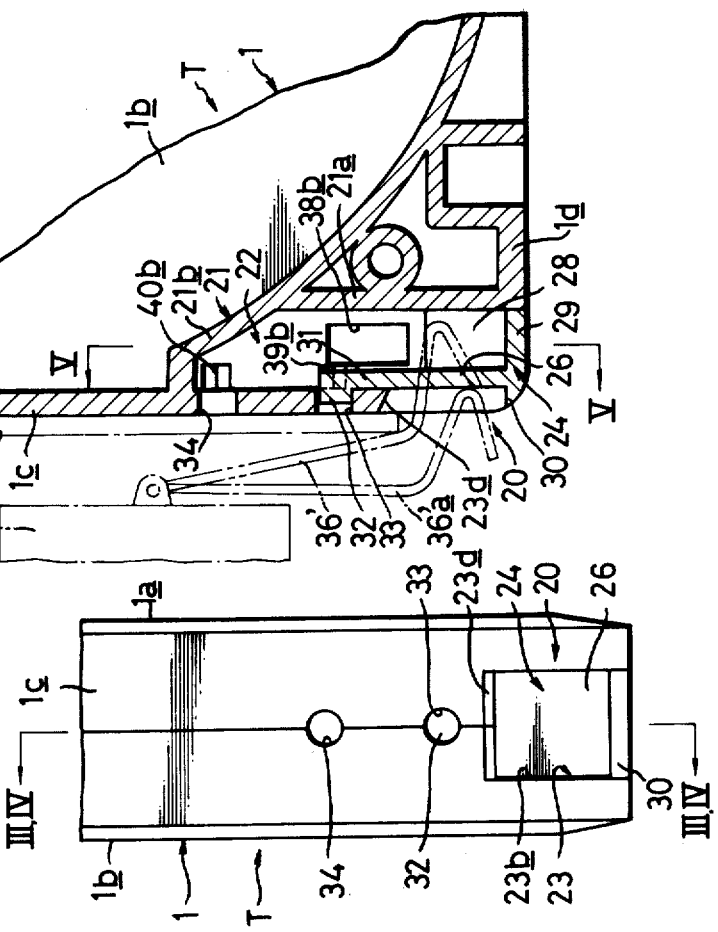

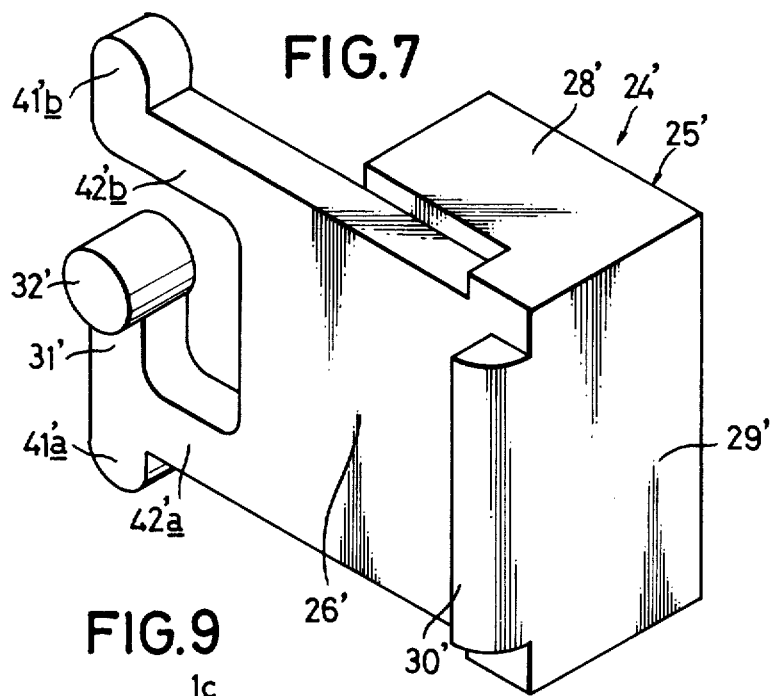
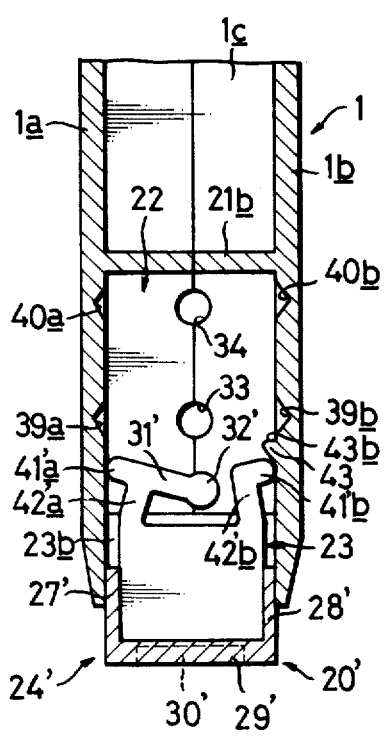
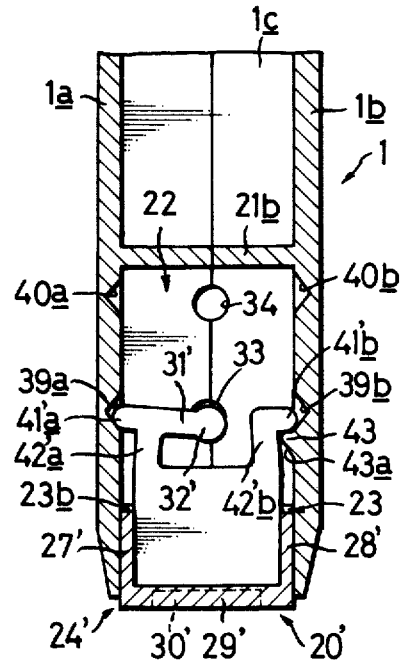

TAPE CASSETTE WITH LOCKING SENSOR SLIDE

BACKGROUND OF THE INVENTION

1. Field of the Invention

This invention relates generally to a tape cassette for use in tape recording and reproducing apparatus, and more particularly is directed to a tape cassette having a safety device adapted to control the recording circuit of the apparatus for preventing inadvertent erasure of previously recorded information on the tape in such cassette.

2. Description of the Prior Art

Tape cassettes of the above described type have previously been proposed which include an integral safety device adapted to prevent inadvertent erasure of previously recorded information on the tape contained within the cassette. In the well known "Phillips" type cassette, such safety device is constituted by a frangible tab which normally extends across an aperture in the peripheral wall of the cassette housing and which is adapted to be engaged by the actuating element of a microswitch in the tape recording and reproducing apparatus when the cassette is disposed at an operative station in such apparatus. The microswitch controls the recording circuit of the apparatus and, when its actuating element is engaged by the tab on a cassette, the microswitch completes the recording circuit so that new information may be recorded on the tape in such cassette or previously recorded information may be erased from the tape. When it is desired to retain the information recorded on the tape and prevent erasure thereof, the tab may be removed so as to leave the respective aperture unobstructed. In that case, when the cassette is disposed at the operative station within the recording and reproducing apparatus, the actuating element of the microswitch can enter the unobstructed aperture with the result that the microswitch maintains the recording circuit of the apparatus in its inoperative mode and, therefore, it is impossible to record over the previously recorded information and/or to erase such information form the tape. While cassettes of the Phillips type have been generally satisfactory, it is to be noted that, once the tab is broken or removed from a cassette, it is no longer possible to re-record information on the tape in such cassette. Therefore, in the event that the information recorded on the tape should subsequently become dispensable, the cassette and the tape therein must either be disposed of, or the cassette housing repaired with considerable difficulty so as to replace the tab thereon. Further, due to the location and configuration of the frangible tabs on such cassettes, consumers frequently experience difficulty in removing the tab from a cassette.

In order to avoid the foregoing problems associated with the described safety device of the Phillips type cassette, it has been proposed, for example, as disclosed in detail in U.S. Pat. No. 3,721,772, issued Mar. 20, 1973, and having a common assignee herewith, to provide a cassette with a safety device in the form of a flat disc having a recess therein which is offset from the central axis of the disc, and with the disc being removable mounted on the cassette housing so as to be selectively disposed in one or the other of two positions which are turned 180° relative to each other. With the foregoing safety device, in one position of the disc on the cassette housing, the actuating element of the microswitch engages the flat surface of the disc so as to cause the microswitch to complete the recording circuit and permit recording of information on the tape within the cassette. In the other position of the flat disc constituting the safety device, the actuating element of the microswitch can engage in the recess of the disc so that the microswitch maintains the recording circuit in its inoperative mode for preventing inadvertent erasure of previously recorded information on the tape. Although the foregoing safety device constituted by a removable disc substantially avoids the above described problems associated with the safety device of the Phillips type cassette, there is the danger that the removable disc may be accidentally removed or separated from the cassette housing during storage or transportation of the cassette, in which case a new disc has to be installed on the cassette housing and may be incorrectly positioned so as to permit erasure of previously recorded information which is to be preserved.

Still another proposed safety device for a tape cassette, for example, as disclosed in detail in U.S. Pat. No. 3,828,363, issued Aug. 6, 1974, is constituted by a slide member which is movable longitudinally in a slot defined in the peripheral wall of the cassette housing so as to be selectively disposable in one or the other of two positions in which the slide member respectively blocks and unblocks the opening to a recess formed in the peripheral wall. Thus, when the slide member is positioned to block the opening to the recess, the actuating element for the microswitch engages the slide member so as to obtain the operative mode of the recording circuit, whereas, when the slide member is positioned to unblock the recess, the actuating element of the microswitch can enter the recess and thereby maintain the recording circuit in its inoperative mode for preventing erasure of previously recorded information on the tape. The foregoing safety device is disadvantageous in that the slide member can be inadvertently displaced from one to the other of its two positions when handling or storing the cassette, with the result that the slide member will thereafter either prevent recording of information on a tape which has not been previously recorded or which contains information that need not be preserved, or will permit the erasure of recorded information that should be preserved.

OBJECTS AND SUMMARY OF THE INVENTION

Accordingly, it is an object of the present invention to provide a tape cassette with an improved safety device for preventing inadvertent erasure of previously recorded information on the tape, and which avoids the above described disadvantages of the existing safety devices.

More specifically, it is an object of this invention to provide a safety device for reusable tape cassettes which may be selectively disposed in one or the other of two positions to prevent erasure of previously recorded information on the tape or to permit such erasure and the recording of information on the tape, respectively, and in which inadvertent movement of the safety device between such two positions is positively prevented.

Another object is to provide a safety device, as aforesaid, in which the safety device is permanently assembled in respect to the cassette housing so as to prevent the inadvertent removal of the safety device.

In accordance with an aspect of this invention, in a tape cassette for use in a tape recording and reproducing apparatus having an actuating element which is engageable by the cassette, when the latter is operatively positioned in the apparatus, for selectively placing the recording circuit of the apparatus in its operative and inoperative modes; the cassette housing is formed with a recess having an opening at a wall portion of the housing which is adjacent the actuating element when the cassette is operatively positioned, a control element is provided with a body portion slidable movable in the recess between positions in which it respectively blocks and unblocks the opening to the recess for controlling the actuating element, and a resilient arm extends from the body portion and terminates in a projection which is selectively engageable in holes formed in the wall portion adjacent the opening to the recess for releasable locking the body portion in a selected one of its aforementioned positions.

In preferred embodiments of the invention, the opening to the above mentioned recess is provided in the peripheral wall of the cassette housing extending between the top and bottom walls of the latter, and at least one of such top and bottom walls has an aperture therein communicating with the recess and located to expose the body portion of the control element only in one of the positions of the latter, for example, the position in which the opening to the recess is unblocked, thereby to provide a visual indication of the position of the control element.

It is a further feature of a safety device according to this invention to provide notches within the recess which are spaced apart in the direction of movement of the body portion of the control element, and further to provide such control element with detents which are selectively engageable in the spaced apart notches in each of the above described positions of the body portion for facilitating the engagement of the locking projection in the respective holes.

The above, and other objects, features and advantages of the invention, will be apparent in the following detailed description of illustrative embodiments of the invention which is to be read in connection with the accompanying drawings.

BRIEF DESCRIPTION OF THE DRAWINGS

FIG. 1 is a perspective view of a tape cassette provided with safety devices according to an embodiment of this invention;

FIG. 2 is a fragmentary, enlarged side elevational view of a portion of the tape cassette of FIG. 1 which contains one of the safety devices according to this invention;

FIG. 3 is a detail sectional view taken along the line III—III on FIG. 2, and showing a control element of the safety device in one of its two positions;

FIG. 4 is a view similar to that of FIG. 3, but showing the control element in the other of its two positions;

FIG. 7 is a perspective view similar to that of FIG. 6, but showing a control element of a safety device according to another embodiment of this invention;

FIG. 8 is a sectional view similar to that of FIG. 5, but illustrating the embodiment of this invention employing the control element of FIG. 7; and FIG. 9 is a view similar to that of FIG. 8, but illustrating the manner in which the control element is assembled together with the cassette housing.

DESCRIPTION OF THE PREFERRED EMBODIMENT

Figure 5:
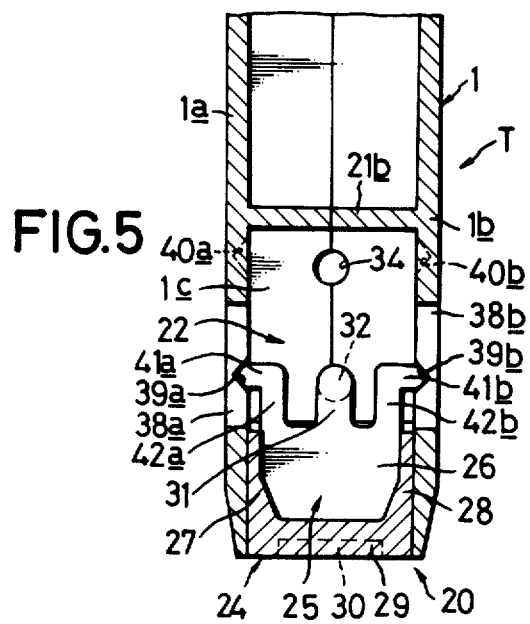
FIG. 5 is a detail sectional view taken along the line V—V on FIG. 3.

Referring initially to FIG. 1, it will be seen that a tape cassette T to which the present invention is applied may comprise a substantially rectangular cassette housing 1 formed of mating, molded plastic upper and lower sections 1A and 1B which are suitable secured together, for example, by screws (not shown). The housing sections 1A and 1B are respectively constituted by top and bottom walls 1a and 1b having peripheral flanges extending along one of the relatively long sides and both of the relatively short sides of the rectangular housing 1 for defining a peripheral wall made up of side wall portions 1c and a back wall portion 1d. Since the peripheral wall extends along only three of the sides of rectangular housing 1, an opening 2 is defined between top and bottom walls 1a and 1b along the fourth relatively long side of the housing.

A supply of tape 3 is contained in housing 1 and is wound on supply and takeup reels 4a and 4b having their hubs loosely and rotatably guided in circular holes 5a and 5b provided in the top and bottom walls of housing 1. Guide rollers 6 are rotatable mounted between top and bottom walls 1a and 1b at the corners of housing 1 which are at opposite ends of opening 2 for guiding tape 3 between reels 3a and 3b in a run extending along the fourth or open long side of the cassette housing. As shown, top and bottom walls 1a and 1b may be provided with pairs of aligned, generally U-shaped cutouts 7a and 7b which communicate with opening 2, and which are symmetrically disposed adjacent the opposite ends of the respective long side of the housing. The illustrated tape cassette T is further shown to be provided with lid members 8a and 8b mounted to pivot relative to housing 1 about respective pivot axes disposed adjacent the corners of rectangular housing 1 which are at opposite ends of the long open side of the housing, and which are spring-biased to their closed positions shown on FIG. 1. The pivot axes of lid members 8a and 8b are perpendicular to the planes of top and bottom walls 1a and 1b for permitting swinging movements of the lid members in directions parallel to such planes between the illustrated closed positions in which lid members 8a and 8b extend along at least part of the open long side of the housing for covering or protecting at least respective parts of the tape in the run between guide rollers 6, and opened positions in which lid members 8a and 8b are displaced from the opening 2 for permitting the withdrawal of the tape through such opening by suitable tape withdrawing means (not shown) which initially extend into cutouts 7a and 7b.

If desired, as shown on FIG. 1, a plurality of holes 9 may be provided in back peripheral wall portion 1d of the cassette housing, with each of such holes 9 having a frangible tab 10 therein which can be selectively removed so that the presence or absence of the tabs 10 may be detected by suitable detecting levers (not shown) of a tape recording and reproducng apparatus for automatically establishing the correct tape transporting speed and/or the correct equalization and bias current for the magnetic material of the tape 3 contained in the cassette T.

In accordance with the present invention, a tape cassette, for example of the type described above with reference to FIG. 1, is provided with at least one safety device 20 for preventing inadvertent erasure of information previously recorded on the tape 3. In the case where information signals are to be recorded in, and reproduced from a plurality of tracks on tape 3 with the tape moving from supply reel 4a to takeup reel 4b, and from takeup reel 4b to supply reel 4a, respectively, in which case the tape cassette T is disposed in one position for recording and reproducing signals in one track or set of tracks on tape 3 and is inverted from such position for recording and reproducing signals in another track or set of tracks, the tape cassette may be provided with two safety devices 20 according to this invention disposed at corners of rectangular housing 1 which are at opposite ends of back peripheral wall portion 1d, as shown on FIG. 1, so as to be alternately effective for preventing inadvertent erasure of information signals previously recorded in the respective track or tracks.

As shown particularly on FIGS. 3 and 4, each of the safety devices 20 according to this invention includes a partition 21 extending between top and bottom walls 1a and 1b of housing 1 adjacent the respective corner of the latter for defining a recess 22. The partition 21 is shown to include a portion 21a extending forwardly from back peripheral wall portion 1d in parallel, spaced relation to the adjacent side peripheral wall portion 1c, and a forward portion 21b which extends from portion 21a of the partition to the adjacent side peripheral wall portion 1c. An opening 23 to recess 22 is provided in the peripheral wall of housing 1 at the respective corner of the cassette housing, and such opening 23 is shown to include a part 23a in back peripheral wall portion 1d and a part 23b in the adjacent side peripheral wall portion 1c (FIG. 4). Further, flanges 23c extend along the top and bottom edges of the part 23b of opening 23 provided in side peripheral wall portion 1c, and the forward edge of such part 23b of the opening is bevelled, as indicated at 23d.

Figure 6:
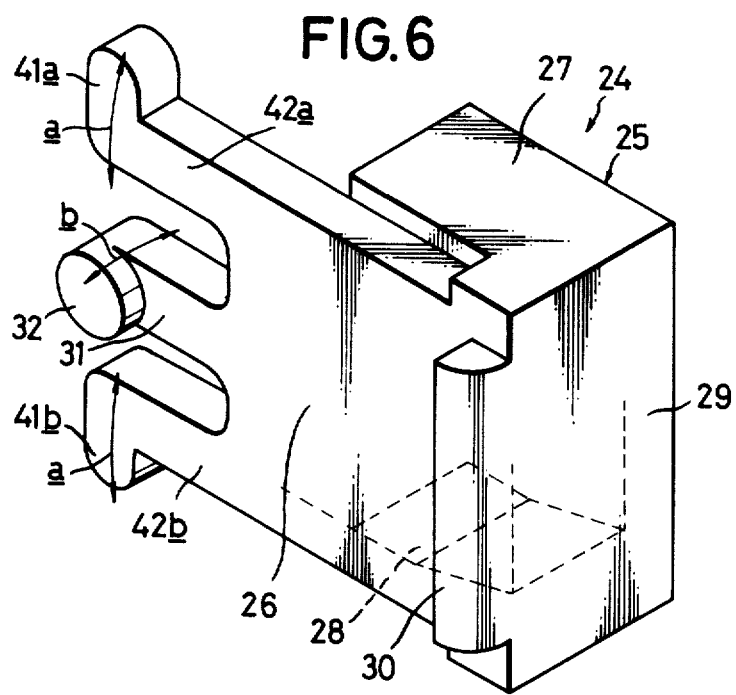
FIG. 6 is an enlarged perspective view of the control element included in the embodiment of the invention illustrated by FIGS. 2-5.

Each of the safety devices 20 according to this invention is further shown to comprise a control element 24 which is slidably movable in the respective recess 22 in directions parallel to the adjacent side peripheral wall portion 1c. The control element 24 is preferably molded of a suitable plastic resin and, as shown particularly of FIG. 6, includes a body portion 25 having an outer wall 26, top and bottom walls 27 and 28 extending from the top and bottom, respectively, of outer wall 26 with the outer surfaces of walls 27 and 28 in parallel relation to each other, and a rear wall or head 29 extending between top and bottom walls 27 and 28 at the back ends of the latter and having a lip 30 which is directed outwardly beyond outer wall 26. Body portion 25 is dimensioned so that its top and bottom walls 27 and 28 will slidably engage top and bottom walls 1a and 1b of housing 1 within the respective recess 22 and will be guided, at their inner sides, by portion 21a of partition 21 and, at their outer sides, by the respective side peripheral wall portion 1c of the housing and by flanges 23c along the top and bottom edges of part 23b of the opening 23. At least the lip 30 of head 29 is dimensioned so that the lip can project outwardly in part 23b of opening 23 between flanges 23c (FIGS. 3 and 4). Thus, it will be apparent that body portion 25 of control element 24 is slidably movable in recess 22 between a first position (FIG. 3) in which head 29 substantially fills or blocks part 23a of opening 23 and outer wall 26 blocks part 23b of the opening to recess 22, and a second or forwardly displaced position (FIG. 4) in which both parts 23a and 23b of opening 23 are unblocked.

In accordance with this invention, control element 24 further includes a resilient arm 31 directed forwardly from outer wall 26 of body portion 25 approximately midway between top and bottom walls 27 and 28 having an outwardly directed projection 32 extending from the free end portion of arm 31. Further, as shown particularly on FIGS. 2, 3 and 4, holes 33 and 34 are formed in side peripheral wall portion 1c of the cassette housing adjacent opening 23 and are spaced apart in the direction of the slidable movement of resilient arm 31 with body portion 25 of the control element for selectively receiving the projection 32 on arm 31 when body portion 25 of control element 24 is in the positions shown on FIGS. 3 and 4, respectively.

It will be apparent from the above that, with projection 32 engaged in hole 33, as shown on FIG. 3, control element 24 is locked in the position in which its body portion 25 blocks opening 23. On the other hand, with projection 32 engaged in hole 34, as on FIG. 4, control element 24 is locked in the position in which its body portion 25 unblocks the opening 23 to recess 22. So long as projection 32 is engaged in either hole 33 or hole 34, control element 24 is positively locked or secured in its respective position, that is, the position of control element 24 cannot be inadvertently changed, as when the cassette T is being handled, transported or stored. If it is desired to change the position of control element 24, for example, from the position shown on FIG. 3 to that shown of FIG. 4, a pencil or other pointed implement is pressed into hole 33 against projection 32 so as to flex resilient arm 31 inwardly for disengaging projection 32 from hole 33, whereupon, head 29 of control element 24 may be pressed forwardly for similarly moving control element 24 until projection 32 engages in hole 34 with the control element in the position shown on FIG. 4. On the other hand, when it is desired to move control element 24 from the position shown on FIG. 4 to that shown on FIG. 3, a pencil or other pointed implement is inserted in hole 34 and pressed against projection 32 so as to once again inwardly flex resilient arm 31 for disengaging projection 32 from hole 34, whereupon, a fingernail or the like can be inserted between lip 30 and head 29 and the bevelled edge 23b of opening 23 for pushing control element 24 rearwardly until control element 24 attains the position shown on FIG. 3 at which projection 32 snaps into or engages hole 33.

By reason of the arrangement of safety device 20 according to this invention at a corner of the rectangular cassette housing 1, such safety device is adapted to control a switch actuating element which is disposed either in back of the cassette housing or at a side thereof when the cassette is operatively positioned in a tape recording and reproducing apparatus. Thus, for example, a microswitch 35 having an actuating element 36 and being effective to control the recording circuit of a recording and reproducing apparatus may be disposed in back of the cassette T when the latter is operatively positioned in a holder indicated schematically in broken lines at 37 on FIG. 4. If the control element 24 of safety device 20 is then positioned to unblock opening 23 of recess 22, as shown on FIG. 4, actuating element 36 can extend through part 23a of opening 23 into recess 22, as shown in full lines on FIG. 4, and thereby establish the open condition of microswitch 35 so that the recording circuit is maintained in its inoperative mode for preventing erasure of information signals previously recorded on the tape in cassette T. On the other hand, if the operatively positioned cassette T has the control element 24 of its safety device 20 positioned to block opening 23 to recess 22, the head 29 of control element 24 then blocks the entry of actuating element 36 into recess 22 so as to displace such actuating element to the position indicated in broken lines at 36a on FIG. 4, with the result that microswitch 35 is changed over to its closed condition for permitting the recording of information signals on the tape and/or the erasure of signals previously recorded on the tape. Alternatively, if the microswitch is disposed at one side of the operatively positioned tape cassette, for example as indicated in broken lines at 35' on FIG. 3, then the actuating element of the microswitch 35' is moved to the position indicated at 36a' for establishing the operative mode of the recording circit by engagement of such actuating element with the wall 26 of control element 24 when the latter is disposed for blocking the opening 23 to recess 22. On the other hand, if control element 24 is then disposed to unblock the opening 23 to recess 22, as shown on FIG. 4, the actuating element of microswitch 35' can then enter recess 22 through part 23b of opening 23 and thus attain the position indicated in broken lines at 36' on FIG. 3 for establishing the inoperative mode of the associated recording circuit.

Although the position of control element 24 of each safety device 20 can be readily ascertained by viewing the respective corner of cassette housing 1 in the direction toward the peripheral wall of the latter, it is also desirable that the position of the control element 24 be observable when the cassette housing 1 is viewed from above or below. Therefore, in accordance with this invention, each safety device 23 further includes apartures 38a and 38b formed in top and bottom walls 1a and 1b of the cassette housing and communicating with the respective recess 22. Such apertures 38a and 38b are disposed, as shown particularly on FIGS. 3–5, so as to expose the top and bottom walls 27 and 28 of body portion 25 only when the latter is positioned, as on FIG. 4, for unblocking opening 23 to recess 22. Thus, if walls 27 and 28 of body portion 25 are suitably brightly colored, the exposure or appearance of such brightly colored walls in apertures 38a and 38b will clearly indicate to the user that the tape in the respective cassette has information signals recorded thereon which are not to be erased.

Since the projection 32 on resilient arm 31 is preferably dimensioned to engage closely in either hole 33 or hole 34 for securely locking control element 24 in one or the other of its positions, some difficulty may be experienced in accurately aligning projection 32 with hole 33 or hole 34 when changing the position of control element 24. In order to overcome the foregoing difficulty, V-shaped notches 39a and 40a are formed in top wall 1a within recess 22 and are spaced apart in the direction of movement of control element 24, and similarly located V-shaped notches 39b and 40b are formed in bottom wall 1b of cassette housing 1. Further, resiliently mounted detents 41a and 41b are located on control element 24 (FIGS. 5 and 6) so as to be engageable in notches 39a and 39b when projection 32 is aligned with hole 33, whereas detents 41a and 41b engage in notches 40a and 40b when projection 32 is aligned with hole 34. It will be apparent that, by reason of the V-shaped configuration of notches 39a, 39b, 40a and 40b, as projection 32 nears a position of alignment or registration with hole 33 or hole 34 when changing the position of control element 24, the engagement of detents 41a and 41b in the respective V-shaped notches will further cause displacement of control element 24 to the respective position in which projection 32 snaps into hole 33 or hole 34.

In the embodiment of the invention presently being described, the detents 41a and 41b are provided on respective resilient arms 42a and 42b which extend forwardly from outer wall 26 of the body portion of control element 24 and below, respectively, the resilient arm 31 carrying projection 32. The arms 42a and 42b are adapted to flex toward and away from each other substantially in the plane of outer wall 26, for example, as indicated by the arrow a on FIG. 6, so as to permit movement of the respective detents 41a and 41b into and out of the above described V-shaped notches, whereas, the resilient arm 31 is adapted to flex laterally, as indicated by the arrow b, so as to permit movement of its projection 32 into and out of the holes 33 and 34.

Referring now to FIGS. 7 and 8, it will be seen that a safety device 20' according to another embodiment of this invention is generally similar to the previously described safety device 20 and has its corresponding parts identified by the same reference numerals. The safety device 20' differs substantially from the first described embodiment only in respect to its control element 24' which, as before, is slidable longitudinally in the recess 22 which has an opening 23 at the respective corner of the cassette housing 1. In the control element 24', the body portion 25' thereof again includes an outer wall 26', top and bottom walls 27' and 28', and a back wall or head 29' formed with a lip 30' which extends laterally beyond outer wall 26'. However, in control element 24', projection 32' for selective engagement in holes 33 and 34 and detent 41a' for engagement in one or the other of the V-shaped notches 39a and 40a are provided on the same resilient arm. More specifically, as shown particularly on FIG. 7, only two spaced apart resilient arms 42a' and 42b' extend forwardly from outer wall 26' of body portion 25' and have the detents 41a' and 41b' provided at the free end portions of such resilient arms. Further, the free end portion of resilient arm 42a' is provided with an extension 31' directed toward the other resilient arm 42b' and having the projection 32' formed thereon so as to be located substantially midway between resilient arms 42a' and 42b'. Thus, arms 42a' and 42b' are again adapted to flex toward and away from each other for permitting the movement of the respective detents 41a' and 41b' into and out of the notches 39a and 40a and the notches 39b and 40b, respectively. Further, arm 42a' is intended to flex in a torsional manner so as to permit movement of projection 32' into and out of holes 33 and 34.

Further, in the safety device 20' a ramp 43 is formed in recess 22 immediately in back of notch 39b and such ramp 43 is formed with an inclined back surface 43a and with a front surface or shoulder 43b perpendicular to bottom wall 1b of the cassette housing.

When control element 24' is to be initially inserted in recess 22 during assembly of the tape cassette according to this invention, such control element 24' is merely pushed forwardly in recess 22 through the back part of its opening 23 and, during forward movement of the control element, its detent 41b' merely rides on the inclined back surface 43a of ramp 43 with consequent flexing of the respective arm 42b', as shown on FIG. 9, until detent 41b' snaps in fron of shoulder 43b of the ramp. Thereafter, as indicated on FIG. 8, any attempt to remove control element 24' from recess 22 is prevented by engagement of detent 41b' against the shoulder 43b at the front side of ramp 43. Therefore, control element 24' is permanently associated with cassette housing 1 following its assembly with the latter.

It will be apparent that a structure similar to the above described ramp 43 of safety device 20' may be provided in the safety device 20 previously described herein so as to prevent the removal or disassembly of the control element 24 from the cassette housing 1.

Although specific embodiments of this invention have been described in detail herein with reference to the accompanying drawings, it it to be understood that the invention is not limited to those precise embodiments, and that various changes and modifications may be effected therein by one skilled in the art without departing from the scope or spirit of the invention as defined in the appended claims.

What is claimed is:

1. A tape cassette for use in tape recording and reproducing apparatus that includes cassette locating means for positioning the cassette at an operative station in the apparatus, and an actuating element that extends adjacent said station and is movable between two positions for selectively placing the recording circuit of said apparatus in its operative and inoperative modes respectively: said cassette comprising a housing including a wall portion, and means defining a recess in said housing with an opening to said recess at a location in said wall portion which is disposed adjacent said actuating element when the cassette is at said operative station; and a control element including a body portion slidably movable in said recess between first and second positions in which said body portion substantially blocks and unblocks, respectively, said opening to the recess so that, in said first position of said body portion, the latter excludes said actuating element from said recess for establishing one of said two positions of the actuating element and, in said second position of said body portion, the latter permits the entry of said actuating element through said opening into said recess for establishing the other of said two positions of the actuating element, and a resilient arm connected at one end with said body portion for movement with the latter along an inner surface of said wall portion adjacent said opening to the recess, said resilient arm having an outwardly directed projection adjacent its other end, and said wall portion having first and second through-holes therein spaced apart in the direction of said movement of the resilient arm with said body portion and selectively receiving said projection in said first and second position, respectively, of the body portion, each of said through holes being dimensioned to closely engage said projection when the latter is received therein for locking said body portion in the respective one of said positions of the latter and for permitting disengagement of the projection therefrom only by inward displacement of said projection substantially normal to said wall portion said projection, when received in one of said through-holes, being accessible through the latter from the outside of said wall portion for effecting said inward displacement of said projection out of said one through-hole and thereby freeing said body portion for movement to the other of said positions of the latter.

2. A tape cassette according to claim 1; in which said housing includes top and bottom walls and a peripheral wall extending between said top and bottom walls, and said wall portion having the opening to said recess therein is a part of said peripheral wall.

3. A tape cassette according to claim 2; in which said top and bottom walls of the housing are substantially rectangular to provide said peripheral wall with corners, and said opening to the recess is at one of said corners of the peripheral wall.

4. A tape cassette according to claim 2; in which at least one of said top and bottom walls of the housing has an aperture therein communicating with said recess and located to expose said body portion of the control element only in said second position of the latter for providing a visual indication of the position of said control element.

5. A tape cassette according to claim 1; in which said recess has first and second notches therein spaced apart in said direction of movement of said resilient arm with said body portion, and said control element further includes detent means selectively engageable in said spaced apart first and second notches whenever said body portion is adjacent said first and second positions, respectively, said detent means and said first and second notches being shaped to urge said body portion to said first and second positions of the latter upon engagement of said detent means with said first and second notches, respectively and thereby facilitating the engagement of said projection in a selected one of said holes.

6. A tape cassette according to claim 5; in which said housing includes top and bottom walls, and a peripheral wall extending between said top and bottom walls with said wall portion having said opening to the recess being a part of said peripheral wall; and in which said notches are formed in said top and bottom walls, and said detent means includes upper and lower detent members resiliently connected to said body portion and riding against said top and bottom walls for selective engagement in said notches in said top and bottom walls.

7. A tape cassette according to claim 6; in which said detent members are formed on resilient arms extending from said body portion of the control element.

8. A tape cassette according to claim 7; in which said resilient arms having said detent members formed thereon are disposed above and below said resilient arm having said projection thereon.

9. A tape cassette according to claim 7; in which one of said detent members is formed on the same resilient arm as said projection.

10. A tape cassette according to claim 1; in which said housing includes substantially rectangular top and bottom walls and a peripheral wall portion extending therebetween to define corners of said housing, said opening to the recess is formed in said peripheral wall portion and extends around one of said corners so as to have parts of said opening in the two sides of said one corner, said body portion of the control element is slidable parallel to one of said sides of the corner and has a head which, in said first position, substantially fills the part of said opening in the other of said sides of said one corner and is flush with the adjacent peripheral wall portion.

11. A tape cassette according to claim 10; in which said head has a lip extending beyond the remainder of said body portion in the part of said opening in said one side of the corner so as to be manually actuable for moving said body portion to said first position thereof.

* * * * *